UNITED STATES PATENT OFFICE.

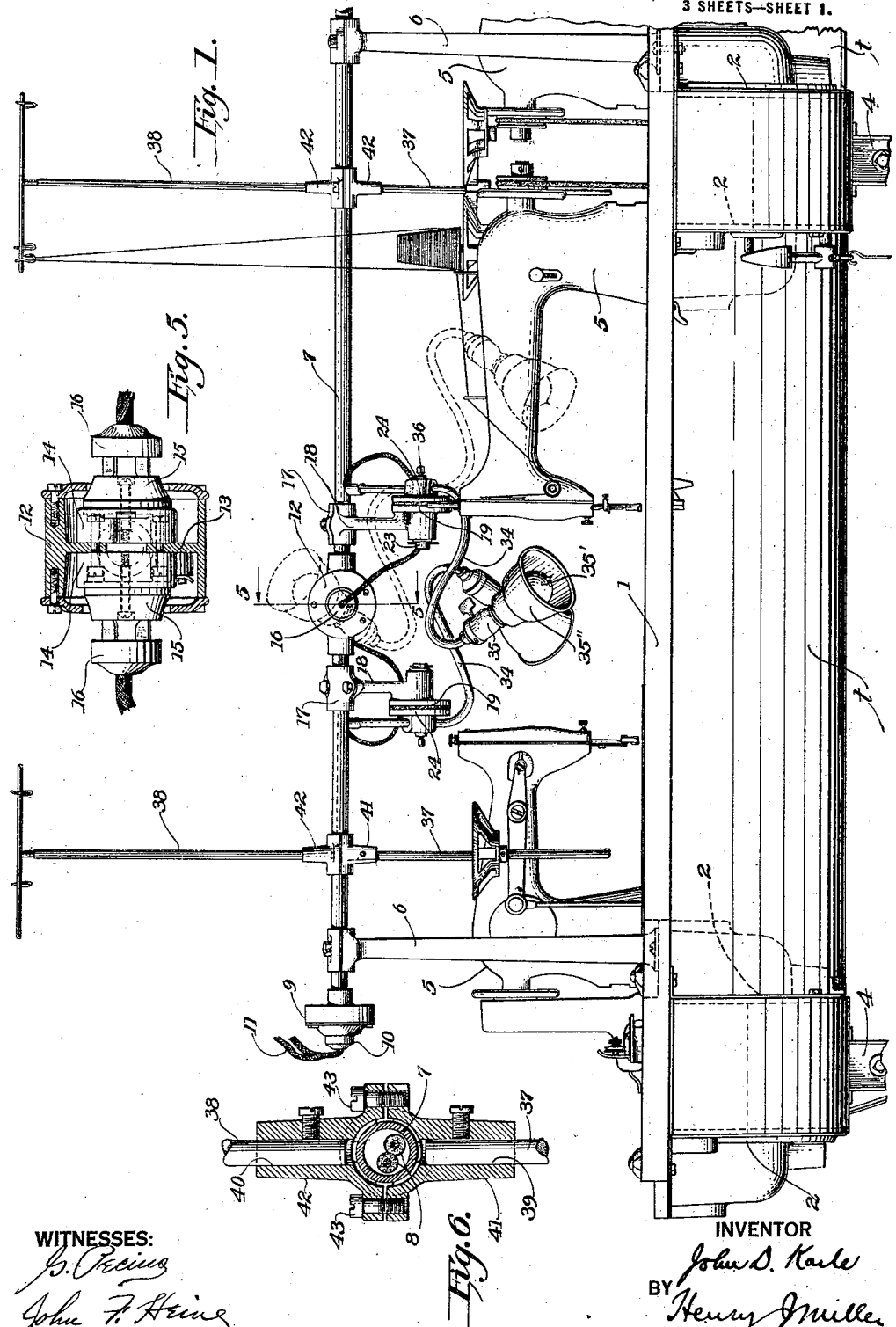

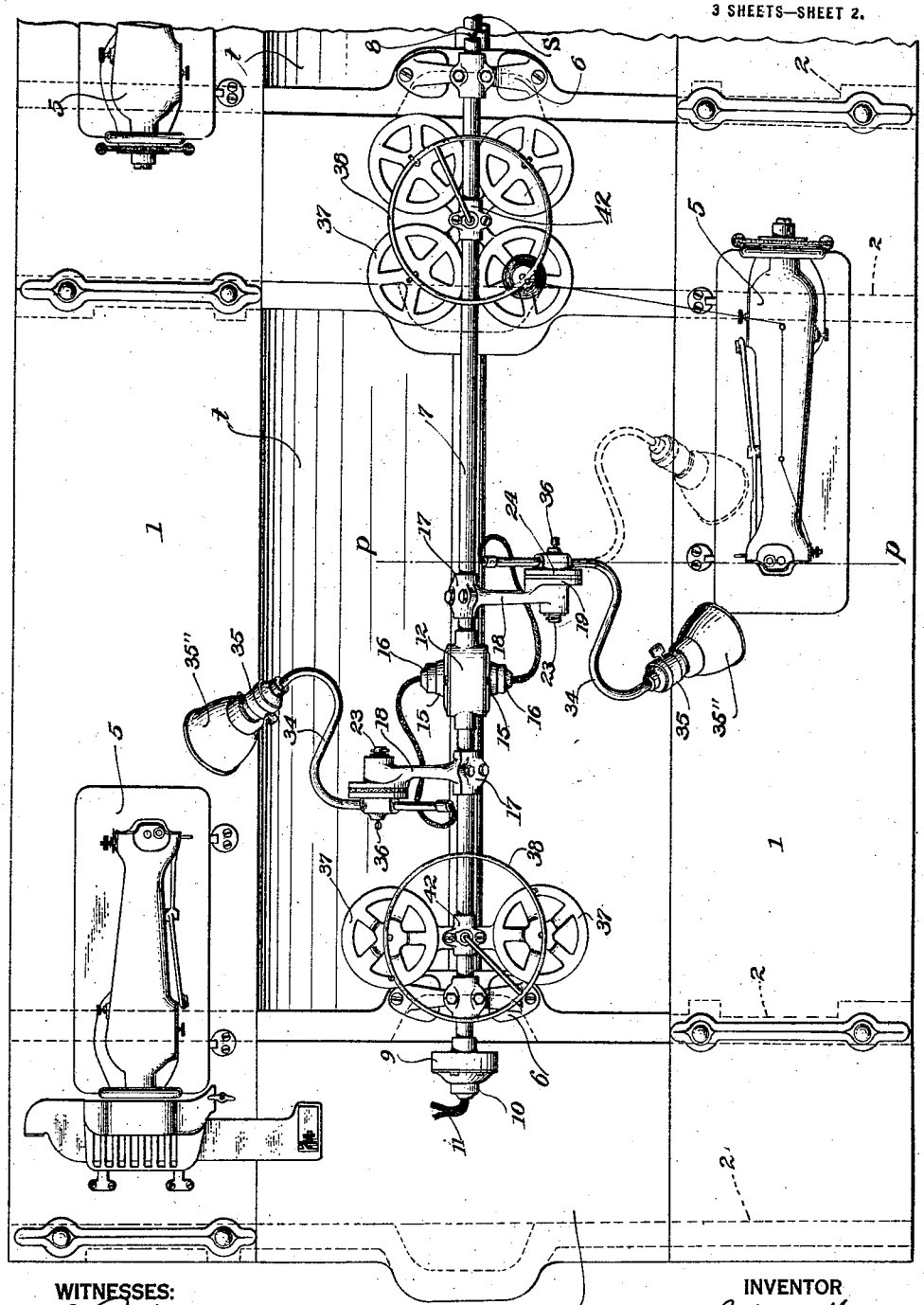

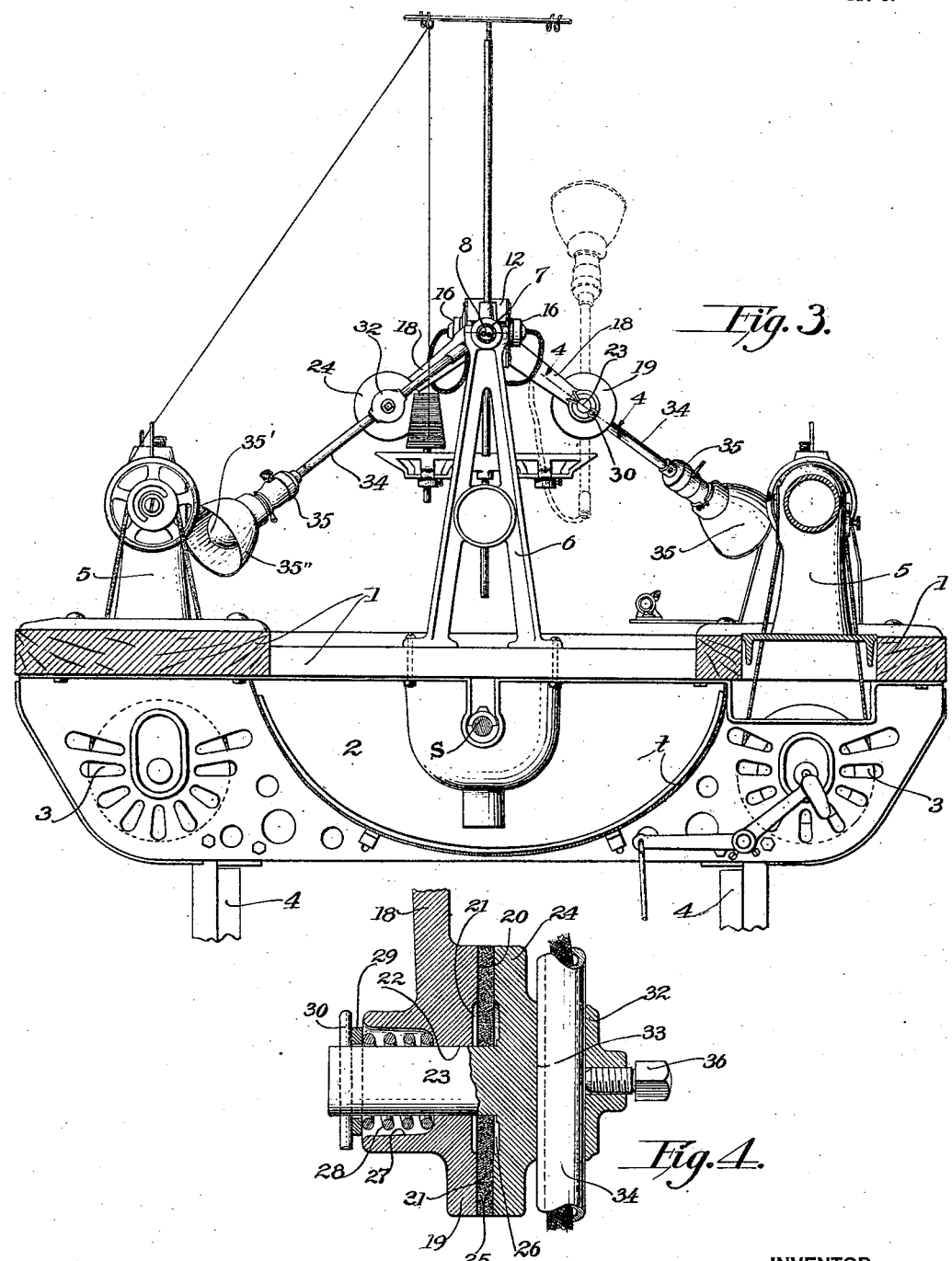

JOHN D. KARLE, OF ROSELLE PARK, NEW JERSEY, ASSIGNOR TO THE SINGER MANUFACTURING COMPANY, A CORPORATION OF NEW JERSEY.

LIGHTING SYSTEM FOR POWER TABLES.

1,415,453.  Specification of Letters Patent.  Patented May 9, 1922.

Application filed May 5, 1919. Serial No. 295,012.

*To all whom it may concern:*

Be it known that I, JOHN D. KARLE, a citizen of the United States, residing at Roselle Park, in the county of Union and State of New Jersey, have invented certain new and useful Improvements in Lighting Systems for Power Tables, of which the following is a specification, reference being had therein to the accompanying drawings.

In factory installations where numerous small machines, such as sewing machines, are to be operated in groups, it is customary to place the machines in rows at opposite sides of long power tables and belt them up to suitable treadle-controlled power-transmission devices which receive power from line-shafts extending lengthwise of and beneath the power-tables.

In order that high quality production may be secured, it is desirable that plenty of light be supplied to the operatives in order that they may quickly and accurately present the work to the machines and properly guide the work during the sewing or other operations. While an abundance of daylight is, of course, to be preferred, it frequently happens that the installations must, by force of circumstances, be so located that sufficient day-light is not available and, again, while many installation may have sufficient natural light on clear days, it often happens that such light is insufficient on cloudy days, particularly during the latter part of such days. For these reasons various artificial lighting systems have been proposed and used. Many of these systems, however, are costly to install. Others are inefficient for the reason that the light is not supplied where it is most wanted and the resulting shadows are annoying.

The present lighting system is designed to overcome the above and other defects of lighting systems heretofore used and to provide means whereby each of the operatives is supplied with an individual lighting unit which may be quickly and conveniently adjusted to efficiently and accurately direct the light upon the work, without spreading the light where it is not needed or desired.

Further objects of the invention will appear from the following description and claims.

In its preferred embodiment, the present system consists of a series of standards supported by and centrally of the power-table and carrying a horizontally disposed conduit for the lighting circuit. The length of conduit between a given pair of adjacent standards is provided with an outlet box in which oppositely disposed receptacles are mounted for supplying the electric current to a pair of lighting fixtures which are preferably clamped to the conduit at opposite sides of the outlet and extend in opposite directions toward the machines to be illuminated. Each of the lighting fixtures comprises a fixed arm rigidly secured to the conduit and a movable arm carried by the fixed arm and terminating in a lamp socket carrying a suitable shade and incandescent lamp. A feature of the invention is the provision of a friction hinge or pivotal connection between the fixed and movable arms, permitting the latter arm to be readily elevated when desired, and as easily lowered to operative position. Another feature of the invention is the adjustable mounting of the movable arm in a socket which is parallel to or substantially coincident with the transverse vertical plane through the stitching point of the corresponding machine, whereby said arm may be turned in said socket to direct the light to the stitching point either from the right or from the left, as best meets the requirements of the particular stitching operation in process. The main conduit also forms a convenient support for spool-holding and thread-guiding fixtures, which are thus held clear of the central part of the table-top where the finished work accumulates.

In the accompanying drawings, Fig. 1 is a side elevation of one of a series of similar sections of a power-table embodying the invention. Fig. 2 is a plan view of the same. Fig. 3 is a cross-section of the table as seen from the right of Fig. 1. Fig. 4 is a section on the line 4, 4, Fig. 3. Fig. 5 is a section on the line 5, 5, Fig. 1 and Fig. 6 is a sectional view of one of the socketed members used for supporting the spool-holding and thread-guiding fixtures.

In the preferred embodiment of the invention, the lighting system is shown as carried by a power table constructed in accordance with the disclosure of the U. S. patent application of O. L. Dosch, Serial No. 173,083, filed June 6, 1917, and comprising a table-top 1 which is carried by suitable transverse rails 2 arranged in pairs to form housings for the transmitters 3 which receive power from the line-shaft s extending longitudinally of the table, below the level of the table-top 1 and within the work receiving trough t. The rails 2 are carried by suitable legs 4, 4 of a length sufficient to support the table-top 1 at a height convenient for the operatives of the machines 5, 5 which are arranged in rows at opposite sides of the table-top and belted to the transmitters 3 in the usual manner.

Secured to the table-top 1 and rails 2, centrally of the latter, are the standards 6, 6 carrying the horizontal main conduit 7 encasing the electric wires 8 constituting the lighting circuit. An inlet box 9 is provided at one end of the conduit 7 for reception of the plug 10 of the supply circuit 11. The length of conduit 7, between a pair of standards 6 of one section of the table, includes an outlet box 12 having a central web 13 against the opposite faces of which are secured the bases 14 of suitable current taps having oppositely directed sockets 15 for reception of the plugs 16 leading to the lighting fixtures to be described.

Clamped to the conduit 7, at opposite sides of the outlet box 12, are the split socketed extremities 17 of the oppositely directed fixed arms 18 of a pair of lighting fixtures for the machines 5, 5 of the corresponding section of the power-table. As these lighting fixtures are of similar construction, a description of one will suffice. The arm 18 of one of these fixtures is formed with a disk-like free extremity 19 having an annular friction surface 20, Fig. 4, disposed in a plane at right angles to the conduit 7. Within the friction surface 20 is a clearance depression 21 centrally of which and parallel with the conduit 7 is an aperture 22 forming a bearing for the cylindrical pin 23 having a disk-like head 24 which is formed with a friction surface 25 and depression 26 similar to and parallel with the surface 20 and depression 21 of the disk 19. The bearing aperture 22 is enlarged at 27 for reception of the compression spring 28 which surrounds the pin 23 and presses outwardly against the washer 29 held on the pin 23 by a cotter-pin 30. The spring 28 thus acts to yieldingly force the movable disk 24 toward the fixed disk 19. Between the disks 24 and 19 a washer 31 of suitable wear resisting material such as leather, is interposed. The spring 28 is relatively stiff and is under sufficient compression to draw the disk 24 snugly against the friction washer 31.

The movable disk 24 is formed centrally of its exposed face with a boss 32 which is formed with an aperture 33 parallel with the surface 25, for reception of one extremity of the tubular arm 34, the opposite extremity of which is off-set a considerable distance from the plane of the friction surface 25 and from the vertical plane through the axis of the aperture 33. More specifically, the arm 34 is bent substantially to the form of the letter S or, in other words, is given a reverse curve, in order that the usual lighting socket 35 lamp 35' and shade 35'' which are carried at the free extremity of said arm, may be off-set from the transverse vertical plane P—P through the stitching point of the corresponding machine, and may be directed toward said stitching point, as shown in Figs. 1 and 2. The arm 34 is held in adjusted position in the aperture 33 by means of the set-screw 36.

For stitching certain classes of work it is desirable that the light be directed to the stitching point from the left, as shown in full lines in Figs. 1 and 2. With certain other classes of work, however, the light should preferably come from the right, as shown in dotted lines in said figures, and it will be readily understood that by loosening the set-screw 36, the arm 34 may be quickly swung from one to the other of these positions.

When the light 35' is not being used, the arm 34 may be swung upwardly about the pin 23 as an axis, Fig. 3. When it is again desired to use the light it may be instantly restored to correct operative position, which position it will hold indefinitely notwithstanding possible vibration to which it may be subjected.

The provision of the conduit 7 at the longitudinal center of the table-top 1, affords a convenient support for the spool-holding and thread-guiding fixtures 37, 38 fixed respectively, in the downwardly and upwardly directed sockets 39, 40, Fig. 6, of a pair of similar clamping sections 41, 42 secured together in gripping relation with the conduit 7 by means of screws 43. It is to be noted that the clamping sections 41, 42, as well as the arms 18 of the lighting fixtures, may be adjusted to any desired position longitudinally of or angularly about the conduit 7.

Having thus set forth the nature of the invention, what I claim herein is:—

1. In a lighting system for sewing machine power-tables, a lighting unit including a fixed arm and a movable arm frictionally pivoted at the free end of said fixed arm to swing vertically, said movable arm including a support having a socket extending parallel to and closely adjacent the transverse vertical plane through the stitching point of the sewing machine to be illuminated, an arm proper adjustably mounted in said socket and having its extremity offset from but directed toward said vertical plane, and a lighting element mounted at the extremity of said movable arm.

2. A lighting fixture for power-tables comprising, an elongated supporting arm provided at one end with means adapting it to be detachably clamped upon a supporting conduit, said arm being formed at its opposite end with a raised annular surface disposed in a plane substantially parallel with said arm and surrounding a clearance depression, said arm being further formed with a bearing aperture centrally of said depression and at right angles to said surface, a complemental member having a similar surface and a central pin entering said bearing aperture, a ring of relatively soft friction material between said surfaces, a spring device for forcing said surfaces into clamping relation with said ring, and an arm mounted in said complemental member and carrying a lighting element at its free end.

3. In a lighting system for power tables, in combination, a support, a fixed arm carried by said support and having at its extremity an annular surface disposed in a vertical plane and a bearing aperture centrally of and at right angles to said surface, a complemental member having a similar surface and a central pin entering said bearing aperture, a ring of relatively soft friction material between said surfaces, a spring device for drawing said surfaces into engagement with said ring, an arm mounted in said complemental member for adjustment about an axis parallel with said surfaces, and a lighting element carried at the free end of said arm, said arm being bent to the form of a reverse curve to offset said lighting element from the axis of adjustment thereof, thereby permitting the light to be directed inwardly, from either side, toward a vertical plane passing through said axis.

In testimony whereof, I have signed my name to this specification.

JOHN D. KARLE.